United States Patent
Lin et al.

(10) Patent No.: US 9,255,848 B2
(45) Date of Patent: Feb. 9, 2016

(54) PROBE THERMOMETER

(71) Applicant: RADIANT INNOVATION INC., Hsinchu (TW)

(72) Inventors: Tseng-Lung Lin, Hsinchu County (TW); Hsiao-Yu Tsai, Hsinchu (TW); An-Chin Lai, Taichung (TW)

(73) Assignee: Radiant Innovation Inc., Hsinchu (TW)

( * ) Notice: Subject to any disclaimer, the term of this patent is extended or adjusted under 35 U.S.C. 154(b) by 406 days.

(21) Appl. No.: 13/888,541

(22) Filed: May 7, 2013

(65) Prior Publication Data

US 2014/0334523 A1    Nov. 13, 2014

(51) Int. Cl.
*G01K 1/14* (2006.01)
*G01K 1/08* (2006.01)

(52) U.S. Cl.
CPC ... *G01K 1/14* (2013.01); *G01K 1/08* (2013.01)

(58) Field of Classification Search
CPC ............. G01K 7/00; G01K 7/02; G01K 7/22; G01K 1/14
USPC .......................................... 374/179, 163, 183
See application file for complete search history.

(56) References Cited

U.S. PATENT DOCUMENTS

| | | | |
|---|---|---|---|
| 5,204,615 A * | 4/1993 | Richards et al. | 324/755.05 |
| 2003/0212340 A1* | 11/2003 | Lussier et al. | 600/549 |
| 2004/0213323 A1* | 10/2004 | Benjamin | 374/179 |
| 2007/0025415 A1* | 2/2007 | Chen | 374/163 |
| 2007/0025416 A1* | 2/2007 | Chen | 374/163 |
| 2007/0058691 A1* | 3/2007 | Lee | 374/208 |
| 2008/0031704 A1* | 2/2008 | Bobo | 411/411 |
| 2008/0112461 A1* | 5/2008 | Bisch et al. | 374/163 |
| 2009/0168838 A1* | 7/2009 | Harr et al. | 374/163 |
| 2010/0193660 A1* | 8/2010 | Colla et al. | 248/552 |
| 2010/0328090 A1* | 12/2010 | Hiramatsu et al. | 340/687 |

* cited by examiner

*Primary Examiner* — Lisa Caputo
*Assistant Examiner* — Philip Cotey
(74) *Attorney, Agent, or Firm* — Rosenberg, Klein & Lee

(57) ABSTRACT

A probe thermometer comprises a main body, a probe, a self-tapping thread, a temperature sensing unit and a display unit. The interior of the main body has a circuit board. The probe includes a measuring end and a coupling end which couples the main body. The self-tapping thread is formed on the measuring end. The temperature sensing unit is disposed within the probe and the temperature sensing unit is electrically connected to the circuit board. The display unit is disposed on the main body. The display unit, the temperature sensing unit and the circuit board are electrically connected. Thereby, the probe thermometer of the instant disclosure is convenient and effectively reduces cost.

7 Claims, 7 Drawing Sheets

PROBE THERMOMETER

BACKGROUND OF THE INVENTION

1. Field of the Invention

The instant disclosure relates to a probe thermometer; in particular, to a probe thermometer with a self-tapping thread.

2. Description of Related Art

As the standard of living improves, consumers' demand for material needs relatively increases; even food and cuisine are no exceptions. Among the wide variety of low temperature food products that are commercially available, frozen food products may best maintain the freshness of food products. For regular frozen food products, transporting at a low temperature throughout the entire transportation process is generally required. In the industry for transporting low temperature food products, only a fluctuation of +/−2° C. is allowed during the process of transportation. As a result, temperature control becomes particularly important for food products that have various temperature requirements. The finer the temperature control, the more secured is the quality of food products.

However, since the surface of food products are quite hard during defrosting, regular probe thermometers for cooking or measuring liquids cannot effectively penetrate and measure the core temperature of the frozen food products. Thusly, it is impossible to grasp the temperature inside the frozen food products which becomes a significant problem that many wish to resolve in the industry.

SUMMARY OF THE INVENTION

In order to achieve the aforementioned objects, a probe thermometer is provided according to an embodiment of the instant disclosure. Through the incorporation of a self-tapping thread and a probe head of a measuring end, users can take temperature measurements of the interior of frozen foods without the use of excess augers. Specifically, the probe thermometer can rotatively penetrate into the interior of frozen foods via the self-tapping thread and measure the core temperature of frozen foods. Thus, the probe thermometer of the instant disclosure is convenient and effectively reduces cost.

The probe thermometer includes a main body, a probe, a self-tapping thread, a temperature sensing unit, and a display unit. The main body has a circuit board therein. The probe has a measuring end and a coupling end coupled to the main body, and the measuring end has a probe head. The self-tapping thread is formed on the probe head. The temperature sensing unit is disposed in the probe and electrically connected to the circuit board. The display unit is disposed on the main body and electrically connected to the temperature sensing unit and the circuit board.

Preferably, the coupling end has a plurality of ribs which are coupled to the main body.

Preferably, the probe and self-tapping thread are integrally formed.

Preferably, the self-tapping thread is incorporated with the measuring end via welding.

Preferably, the outer surface of the measuring end is formed with a plurality of alignment pins and the inner surface of the probe head (the self-tapping thread) is formed with a plurality of recesses correspondingly and mutually coupled with the plurality of alignment pins.

Preferably, the probe is retractably coupled to the main body.

Preferably, the probe thermometer further includes a light emitting unit disposed on the main body and electrically connected to the circuit board.

The instant embodiment according to the instant disclosure provides a probe thermometer. Through the design of incorporating a self-tapping thread with a probe head of a measuring end, users can take temperature measurements of the interior of frozen foods without the use of excess augers. Specifically, the probe thermometer can rotatively penetrate into the interior of frozen foods via the self-tapping thread and measure the core temperature of frozen foods. Thus, the probe thermometer of the instant disclosure is convenient and effectively reduces cost.

In order to further understand the instant disclosure, the following embodiments and illustrations are provided. However, the detailed description and drawings are merely illustrative of the disclosure, rather than limiting the scope being defined by the appended claims and equivalents thereof.

DETAILED DESCRIPTION OF THE PREFERRED EMBODIMENTS

The aforementioned illustrations and detailed descriptions are exemplarities for the purpose of further explaining the scope of the instant disclosure. Other objectives and advantages related to the instant disclosure will be illustrated in the subsequent descriptions and appended drawings.

[First Embodiment]

Figure 1:
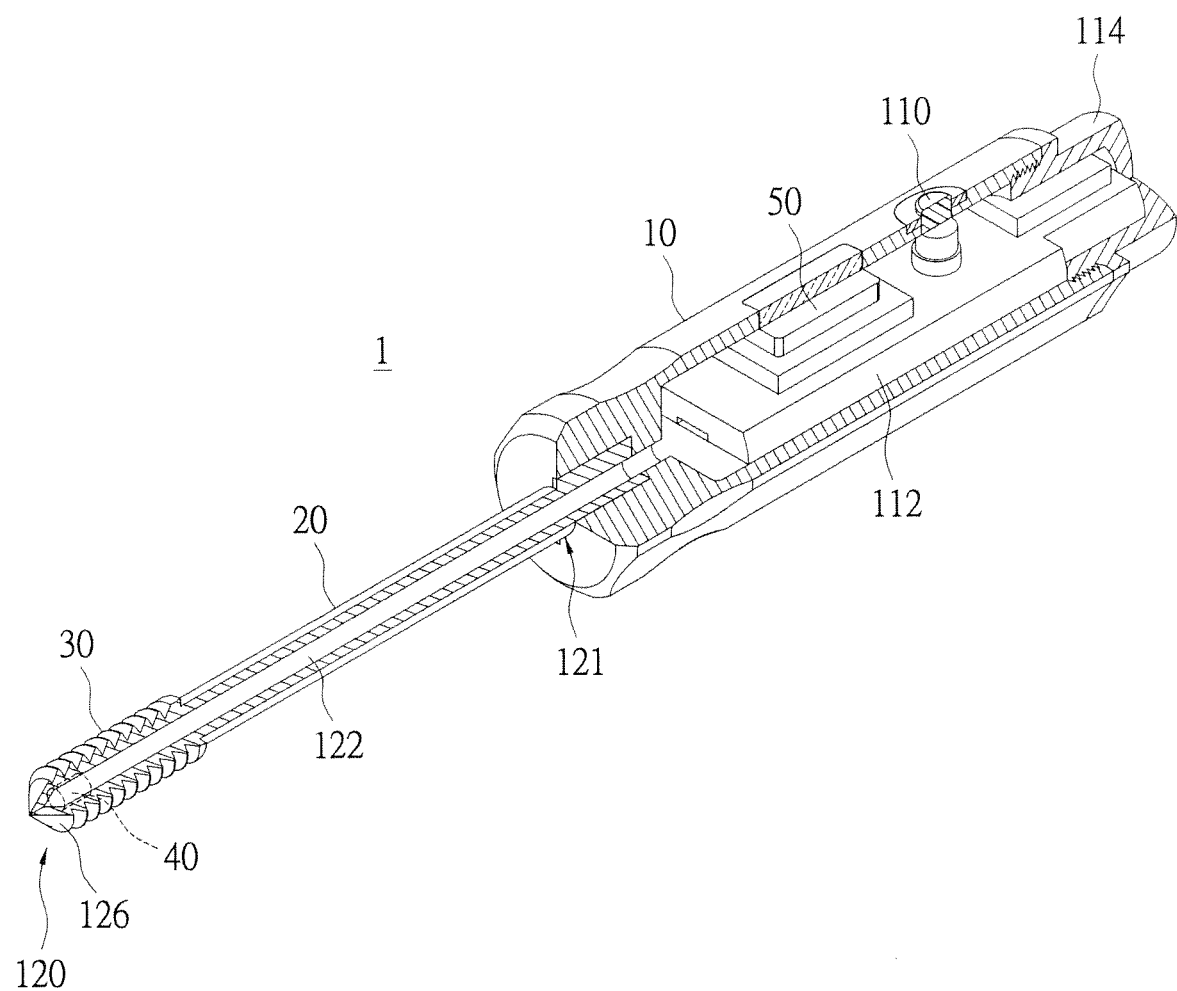
FIG. 1 is a schematic diagram according to the first embodiment of the instant disclosure.
Figure 2:
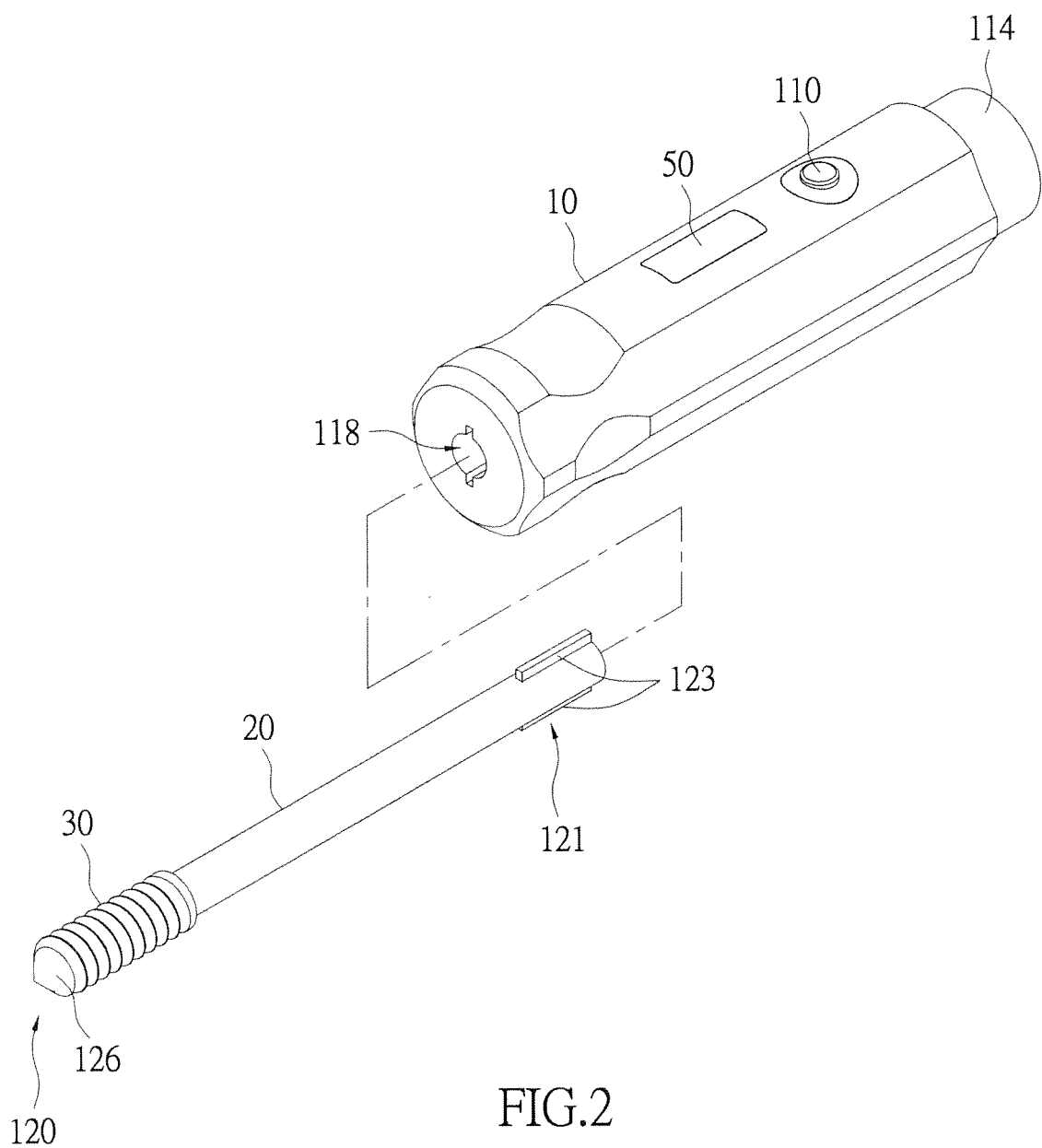
FIG. 2 is an exploded view according to the first embodiment of the instant disclosure.

Please refer to FIGS. 1 and 2. The first embodiment of the instant disclosure provides a probe thermometer 1 including a main body 10, a probe 20, a self-tapping thread 30, a temperature sensing unit 40, and a display unit 50.

In the instant embodiment, the main body 10 includes a circuit board 112 therein. A surface of the circuit board 112 has a plurality of leads (not shown in figures) disposed thereon. The end portion of the main body 10 is connected to the probe 20. The main body 10 further includes a control circuit (not shown in figures), a key unit 110, and a battery cover 114.

In particular, the control circuit, the key unit 110, the temperature sensing unit 40 which is disposed in the probe 20, and the display unit 50 are electrically connected. When the control circuit receives activating signals from the key unit 110, the temperature sensing unit 40 immediately takes temperature measurement and thereafter returns a temperature measurement signal to the control circuit.

The key unit 110 is disposed on the main body 10 and is electrically connected to the circuit board 112 via the control circuit. The battery cover 114 caps another end, which is the end not connected to the probe 20, of the main body 10. The control circuit, key unit 110, battery cover 114 and circuit board 112 are substantially similar to the conventional technologies.

Figure 3:
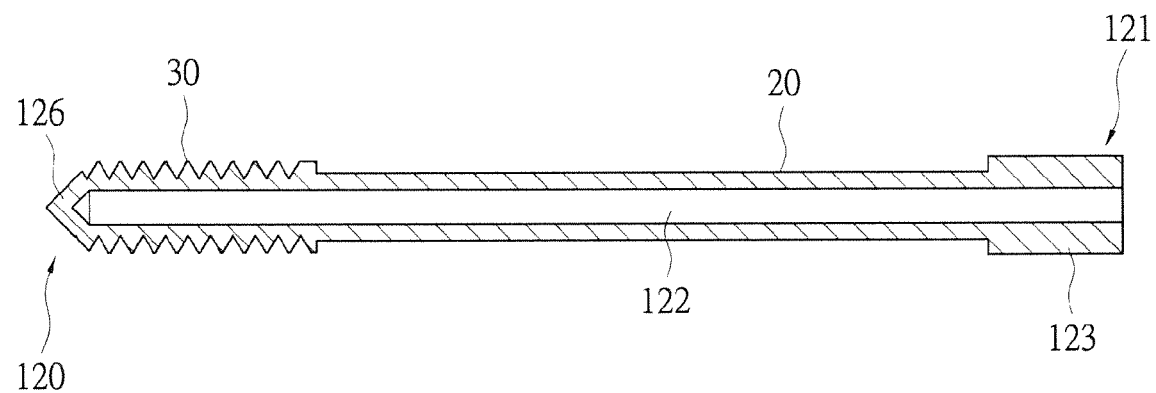
FIG. 3 is a schematic diagram of a probe according to the first embodiment of the instant disclosure.

Please further refer to FIGS. 2 and 3. The probe 20 has a measuring end 120 and a coupling end 121. The coupling end 121 is an end which is coupled to the main body 10 through a plurality of ribs 123. The end of the main body 10 is defined with a groove 118 receiving the plurality of ribs 123 such that through the groove 118 of the main body 10, the plurality of ribs 123 of the coupling end 121 provides coupling between the probe 20 and the main body 10. Moreover, with the plurality of ribs 123 and the groove 118, the probe 20 and the main body 10 can be firmly fixed with respect to each other to prevent the probe from turning or damages due to over torquing when in operation.

The probe 20 is defined with a chamber 122 therein. The chamber 122 extends from the coupling end 121 (the end that is coupled to the main body 10) to about the measuring end 120 of the probe 20. The chamber 122 mainly retains the temperature sensing unit 40 and the leads such that the temperature sensing unit 40 is electrically connected to the circuit board 112. In addition, the probe 20 or the outer surface of the probe 20 is made of stainless steel materials due to the excellent oxidation resistance and corrosion resistance, and furthermore, can prevent the surface of the probe 20 from rusting.

Furthermore, the measuring end has a probe head 126. The probe head 126, the self-tapping thread 30. and the probe 20 are integrally formed such that the probe 20 can provide relatively good rigidity. With the self-tapping thread 30, portions of the probe head 126 can rotatively penetrate into the interior of frozen foods such that the core temperature of frozen foods can be measured. In the instant embodiment, the thread 30 can be left-hand threaded or right-hand threaded, and the outer diameter of the thread 30 can be larger or smaller than the diameter of the probe 20. However, the shape and diameter of the thread is not limited to the examples provided herein.

The temperature sensing unit 40 is disposed in the probe 20 and electrically connected to the circuit board 112. In particular, the temperature sensing unit 40 can be disposed in any portion of the chamber 122. In the instant embodiment, the temperature sensing unit 40 is disposed proximate to a frontal portion (proximate to the measuring end 120) of the chamber 122 such that the core temperature of frozen foods can be accurately measured. Moreover, the temperature sensing unit 40 can be a thermocouple, a platinum resistance temperature detector, or a thermistor. However, the examples provided in the instant disclosure are not limited hereto.

The display unit 50 is disposed on the main body 10. The display unit 50, temperature sensing unit 40, and the circuit board 112 are electrically connected. Once the temperature sensing unit 40 has taken temperature measurements, a temperature measurement signal is sent to the control circuit thereafter and the display unit 50 displays the value of the measured temperature. In the instant embodiment, the display unit 50 is a liquid crystal display unit (LCD unit). However, the examples provided in the instant disclosure are not limited hereto.

[Second Embodiment]

Figure 4:
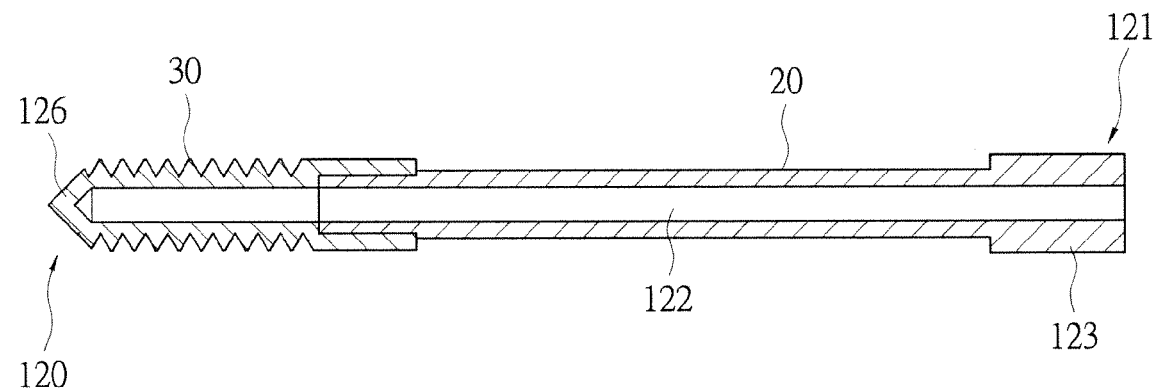
FIG. 4 is a schematic diagram of a probe according to the second embodiment of the instant disclosure.

Please refer to FIGS. 2 and 4. The instant disclosure similarly to the first embodiment provides a probe thermometer 1 including a main body 10, a probe 20, a self-tapping thread 30, a temperature sensing unit 40, and a display unit 50. By comparing FIGS. 4 and 3, the second embodiment differs from the first embodiment of the instant disclosure in that the probe 20 and the probe head 126 of the second embodiment are not integrally formed. Specifically, the probe head 126 is incorporated with the measuring end 120 of the probe 20 via welding.

As a result, with the design in accordance with the second embodiment, the probe head 126 can be firmly fixed to the measuring end 120 of the probe 20, thus production cost can be efficiently reduced.

[Third Embodiment]

Figure 5:
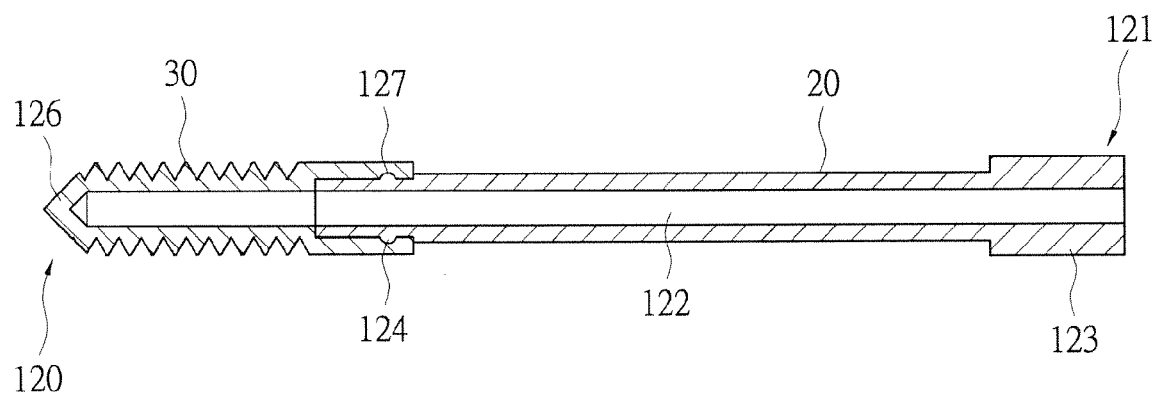
FIG. 5 is a schematic diagram illustrating the first exemplary configuration according to the third embodiment of the instant disclosure.
Figure 7:
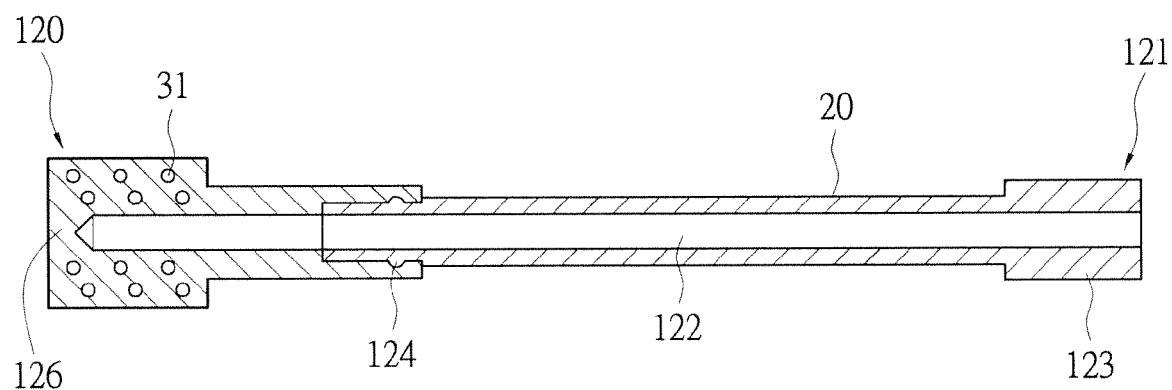
FIG. 7 is a schematic diagram illustrating the third exemplary configuration according to the third embodiment of the instant disclosure.

Please refer to FIGS. 2 and 7. The third embodiment of the instant disclosure provides a probe thermometer 1 including a main body 10, a probe 20, a self-tapping thread 30, a temperature sensing unit 40, and a display unit 50. By comparing FIGS. 5 and 3, the third embodiment differs from the first embodiment of the instant disclosure in that the probe 20 and the probe head 126 of the third embodiment are not integrally formed. The probe 20 and the probe head 126 can be correspondingly coupled and detached via a plurality of alignment pins 124 and a plurality of recesses 127 formed therebetween. In further details, the outer surface of the probe 20 which is proximate to the measuring end 120 is formed with the plurality of alignment pins 124 and the inner surface of probe head 126 is formed with the plurality of recesses 127 that corresponds to the plurality of alignment pins 124. With the coupling of the alignment pins 124 and the plurality of recesses 127, the probe head 126 can be firmly fixed to the measuring end 120 of the probe 20.

Figure 6:
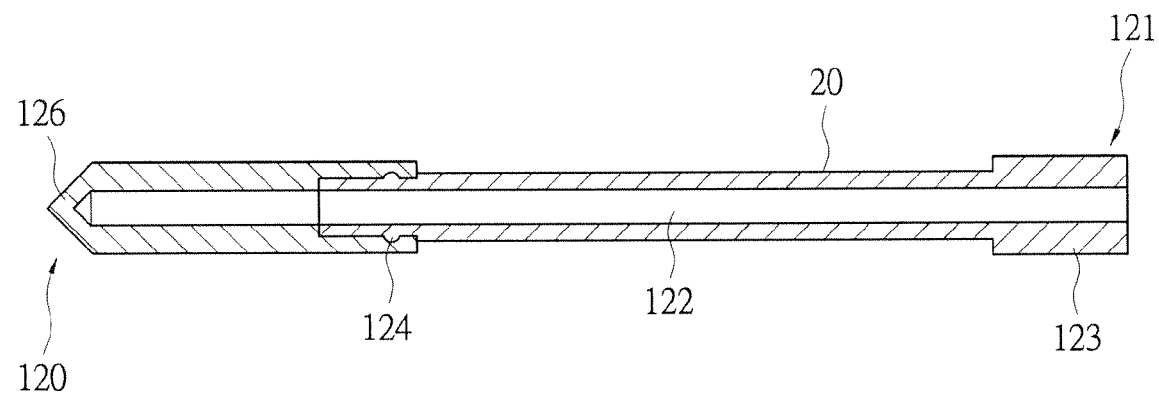
FIG. 6 is a schematic diagram illustrating the second exemplary configuration according to the third embodiment of the instant disclosure.

In other words, with the aforementioned design of the alignment pins 124 and the plurality of recesses 127 in the third embodiment, the probe head 126 of the probe thermometer 1 can be detachable from the probe 20 based on the users' unique needs, or furthermore, the probe 20 can be coupled to various forms of probe heads 126. For example: Please refer to FIG. 6. The outer surface of the probe head 126 is a smooth surface. Please refer to FIG. 7. The outer surface of the probe head 126 is defined with a plurality of apertures 31, and as a result, the probe thermometer 1 can be used for regular foods, frozen foods or take temperature measurements under any environment. Thus, further widening the application of the probe thermometer 1.

[Fourth Embodiment]

Figure 8:
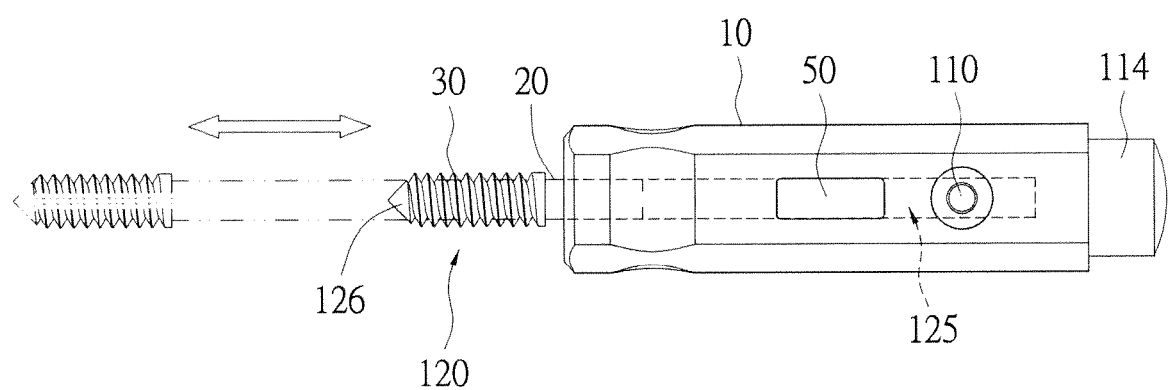
FIG. 8 is a schematic diagram according to the fourth embodiment of the instant disclosure.

Please refer to FIGS. 3 and 8. The fourth embodiment of the instant disclosure provides a probe thermometer 1 including a main body 10, a probe 20, a self-tapping thread 30, a temperature sensing unit 40, and a display unit 50. By comparing FIGS. 8 and 3, the fourth embodiment differs from the first embodiment of the instant disclosure in that the probe 20 of the fourth embodiment can be retractably coupled to the main body 10. For example: The main body 10 has a slot, which correspondingly retains the probe 20. Flexible leads electrically connect the temperature sensing unit 40 with the circuit board 112 mainly so that leads are not subject to impact during the extension or retraction of the probe 20.

As a result, with the design in accordance with the fourth embodiment, the probe 20 of the probe thermometer 1 can be retractably coupled to the main body 10, thus making the probe thermometer 1 portable and convenient for storage.

[Fifth Embodiment]

Figure 9:
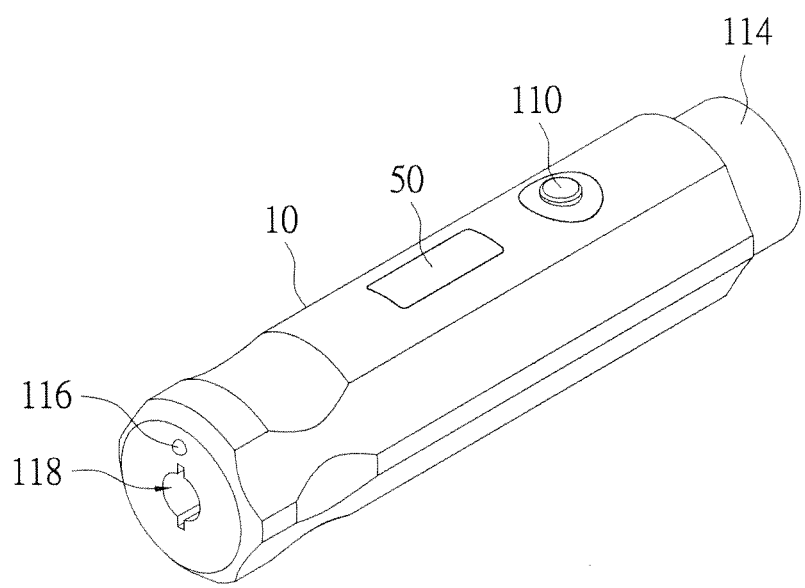
FIG. 9 is a schematic diagram according to the fifth embodiment of the instant disclosure.

Please refer to FIG. 9. The fifth embodiment of the instant disclosure provides a probe thermometer 1 including a main body 10, a probe 20, a self-tapping thread 30, a temperature sensing unit 40, a display unit 50 and a light emitting unit 116. By comparing FIGS. 9 and 2, the fifth embodiment differs from the first embodiment of the instant disclosure in that the light emitting unit 116 is formed on an end portion of the main body 10 proximate to the probe 20. The light emitting unit 116 is electrically connected with the circuit board 112. For example: The light emitting unit 116 can be a light emitting diode or a light bulb. However, the examples provided in the instant disclosure are not limited hereto.

As a result, with the design in accordance to the fifth embodiment, the probe thermometer 1 can take measurements in dim environments or at night in order to solve the problem of taking measurements in dim environments or at night.

In summary, the instant embodiment according to the instant disclosure provides a probe thermometer. Through the design of incorporating a self-tapping thread with a measuring end of a probe head, users can take temperature measurements of the interior of frozen foods without the use of excess augers. Specifically, the probe thermometer can rotatively penetrate into the interior of frozen foods via the self-tapping thread and measure the core temperature of frozen foods. Thus, the probe thermometer of the instant disclosure is convenient and effectively reduces cost.

The figures and descriptions supra set forth illustrated the preferred embodiments of the instant disclosure; however, the characteristics of the instant disclosure are by no means restricted thereto. All changes, alternations, combinations or modifications conveniently considered by those skilled in the art are deemed to be encompassed within the scope of the instant disclosure delineated by the following claims.

What is claimed is:

1. A probe thermometer, comprising:
    a main body having a circuit board therein;
    a probe having a measuring end and a coupling end coupled to the main body, and the measuring end having a hollow probe head;
    a self-tapping thread formed on the outer face of probe head;
    a temperature sensing unit disposed in the probe and electrically connected to the circuit board; and
    a display unit disposed on the main body and electrically connected to the temperature sensing unit and the circuit board;
    wherein the probe head, the self-tapping thread, and the probe are integrally formed, and the probe head has a closed end with a conical shaped tip to allow the probe to directly rotatively penetrate into an interior of a frozen food and measure a core temperature of the frozen food without the use of excess augers.

2. The probe thermometer as recited in claim 1, wherein the coupling end has a plurality of ribs which are coupled to the main body.

3. The probe thermometer as recited in claim 1, wherein the temperature sensing unit is disposed at the measuring end.

4. The probe thermometer as recited in claim 1, wherein the probe or the outer surface of the probe is made of stainless steel materials.

5. The probe thermometer as recited in claim 1, wherein the temperature sensing unit is a thermocouple, a platinum resistance temperature detector, or a thermistor.

6. The probe thermometer as recited in claim 1, wherein the probe is retractably coupled to the main body.

7. The probe thermometer as recited in claim 1 further comprising:
    a light emitting unit disposed on the main body and electrically connected to the circuit board.

* * * * *